United States Patent [19]

Medlar et al.

[11] 4,163,395
[45] Aug. 7, 1979

[54] PRESSURE TRANSMITTER WITH SIMPLIFIED PRESSURE SENSING HEAD

[75] Inventors: Lewis A. Medlar, Oreland; William F. Newbold, Philadelphia, both of Pa.

[73] Assignee: Honeywell Inc., Minneapolis, Minn.

[21] Appl. No.: 837,714

[22] Filed: Sep. 29, 1977

Related U.S. Application Data

[63] Continuation of Ser. No. 682,316, May 3, 1976, abandoned.

[51] Int. Cl.² .......................... G01L 7/08; G01L 19/04
[52] U.S. Cl. ........................................ 73/708; 73/720
[58] Field of Search ................. 73/716, 717, 718, 719, 73/720, 721, 722, 706

[56] References Cited

U.S. PATENT DOCUMENTS

| | | | |
|---|---|---|---|
| 2,906,095 | 9/1959 | Whitehead, Jr. | 73/708 |
| 3,277,719 | 10/1966 | Proll | 73/720 |
| 3,400,588 | 9/1968 | O'Connor | 73/716 |
| 3,533,293 | 10/1970 | Puckett | 73/719 X |
| 3,559,488 | 2/1971 | Weaver | 73/720 |
| 3,618,390 | 11/1971 | Frick | 73/716 |
| 3,656,348 | 4/1972 | Bertrand | 73/722 X |
| 3,712,143 | 1/1973 | Weaver et al. | 73/721 X |
| 3,722,373 | 3/1973 | Beach et al. | 73/716 X |
| 3,780,588 | 12/1973 | Whitehead, Jr. et al. | 73/721 |
| 3,841,158 | 10/1974 | Hunter | 73/416 X |
| 3,853,007 | 12/1974 | Jaquin | 73/710 X |
| 4,073,191 | 2/1978 | Saigusa | 73/718 |

Primary Examiner—Daniel M. Yasich
Attorney, Agent, or Firm—Laurence J. Marhoefer; Lockwood D. Burton; George E. Bodenstein

[57] ABSTRACT

A differential pressure to electrical signal transmitter has a pair of flat barrier diaphragms and a central control diaphragm located between the barrier diaphragms. First chambers between one of the barrier diaphragms and the control diaphragm, and a first length of capillary tubing connected between the first chambers and one chamber of a remotely located sensor capsule, are filled with a first incompressible fill liquid. Second chambers between the other barrier diaphragm and the control diaphragm, and a second length of capillary tubing connected between the second chambers and another chamber of the sensor capsule, are filled with a second incompressible fill liquid. The fill liquids are made to pump up their respective flat barrier diaphragms to cause the latter to have a dome shape and hence to be free from "oil canning." A chamber on the outside of one barrier diaphragm is pressurized with a first fluid, and a chamber on the outside of the other barrier diaphragm is pressurized with a second fluid. The pressures of the two fill liquids act on the opposite sides of a minute displacement sensing element, located between the two sensor chambers, to displace the element and cause it to produce an electrical output signal which is dependent upon the difference between the fill liquid pressures, and hence upon the difference between the pressures of the first and second fluids.

15 Claims, 5 Drawing Figures

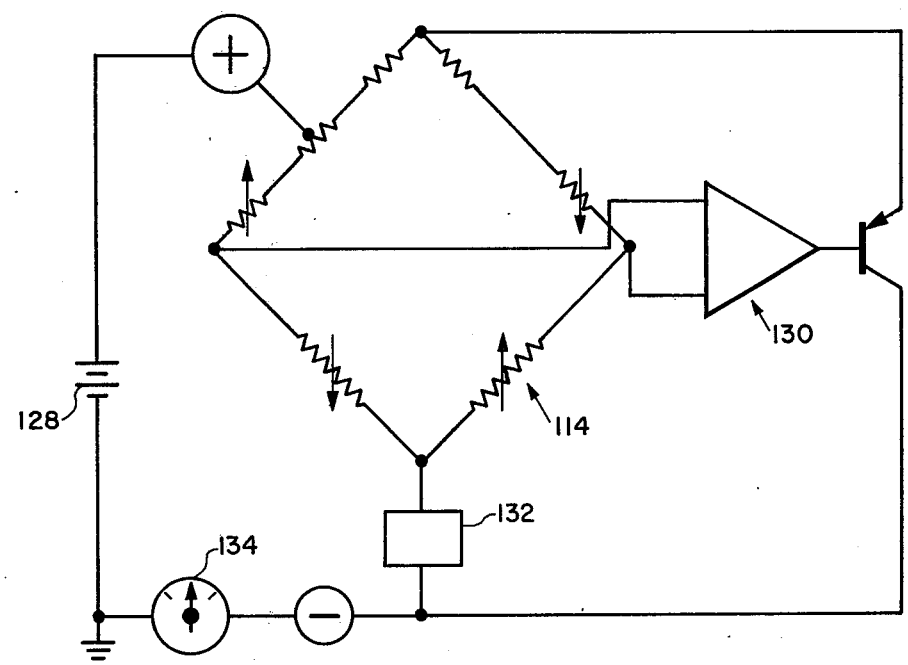
F I G. 5

PRESSURE TRANSMITTER WITH SIMPLIFIED PRESSURE SENSING HEAD

CROSS REFERENCES TO RELATED APPLICATIONS

This is a continuation of application Ser. No. 682,316, filed May 3, 1976, and now abandoned.

Subject matter shown and described herein, but not claimed herein, is shown, described, and claimed in copending application Ser. No. 682,280, now U.S. Pat. No. 4,072,058 of Feb. 7, 1978.

BACKGROUND OF THE INVENTION

1. Field of the Invention

The present invention relates generally to pressure to electrical signal transducers or transmitters, and relates specifically to that type of such transmitters which employs a differential pressure sensor or sensing element to produce an electrical signal of a value dependent upon the difference between two fluid pressures. Transmitters of this type are referred to herein as differential pressure transmitters. More specifically, the invention relates to transmitters of this type which employ barrier diaphragms and fill fluids for transmitting fluid pressures to the sensor.

2. Description of the Prior Art

A typical transmitter of the known form last referred to above includes so-called pressure sensing head structure which contains two barrier diaphragms. A chamber on one side of one diaphragm is pressurized with a fluid having a first pressure, and a chamber on one side of the other diaphragm is pressurized with a fluid having a second pressure. These two fluids, hereinafter referred to as applied fluids, may well be so-called process fluids which are on the two sides of an orifice plate in a process flow line.

A separate chamber on the other side of each of the diaphragms contains an incompressible fill fluid. These fill fluids communicate with the opposite sides of a differential pressure sensor or sensing element, and the latter is displaced or deflected by an amount which is dependent upon the difference between the two pressures of the fill fluids, and which is thus dependent upon the differential pressure of the two applied fluids. The sensor produces an electrical output signal which is dependent upon said displacement and hence upon said differential pressure.

In early forms of such transmitters, each of the barrier diaphragms was essentially a flat membrane or plate. The pressure of the applied fluid on one side of the diaphragm caused it to deflect from its flat condition and hence to transmit the applied fluid pressure to the fill fluid on the other side of the diaphragm. The fill fluid, in turn, transmitted this pressure to the corresponding side of the sensor.

Although such flat barrier diaphragms were desirable because of their simplicity, it was found that they introduced unacceptable errors into the pressure measurements made by the transmitters employing them. Specifically, it was found that the pressure vs. deflection characteristic of such a flat diaphragm suffered from discontinuities, irregularities, and hysteresis as a result of the deflection of the diaphragm about its flat condition. This irregular or inconsistent behavior of the flat diaphragm, known as "oil canning", made it undesirable for use as a barrier diaphragm.

The foregoing problem was largely solved by replacing the flat diaphragm with one having circular convolutions or corrugations. However, such a diaphragm and its use have certain shortcomings. In the first place, special fabricating procedures are required to provide the proper convoluted or other non-flat diaphragm configuration.

Secondly, such a diaphragm configuration does not lend itself to those constructions wherein overpressure protection is to be provided by the use of barrier diaphragm back-up surfaces. As used herein, the term overpressure identifies any value of the differential pressure of the applied fluids which is out of the range of differential pressures that the transmitter is designed to handle and which would produce an unsafe pressure difference across the sensor. In such a construction, each barrier diaphragm is provided with a back-up surface, on which that diaphragm is to bottom-out if the pressure of the applied fluid acting on that diaphragm becomes sufficiently higher than the pressure of the other applied fluid to cause the difference between these pressure to closely approach an overpressure value. Such a bottomed-out diaphragm is protected from being damaged by the pressures producing the overpressure condition, and ideally also prevents these pressures from producing an unsafe pressure difference across the sensor.

For the above-described protection to be effective, the mating surfaces of a barrier diaphragm and its back-up member must match to such a degree that the applied pressure does not further deflect the bottomed-out diaphragm sufficiently to cause a damaging differential pressure to be applied to the sensor. In numerous constructions, it has been found to be difficult, if not impossible, to match the mating surfaces of a convoluted or other non-flat diaphragm and its back-up member to the degree required to fully protect the sensor. Stated differently, it has been found that inherent irregularities in the match between the mating convoluted barrier diaphragm and back-up surfaces allow the above-noted further, damaging deflection of the diaphragm to occur, and thus prevent the back-up surface from being sufficient to properly protect the sensor in certain constructions.

The foregoing is particularly true of those constructions wherein the sensor is of the minute deflection type. Such a sensor has a practically negligible volume displacement, and is readily degraded or damaged by an excession differential pressure. A semiconductor strain gauge element in an example of such a sensor which requires the above-noted degree of surface match which is not readily obtainable in practice.

Because of the shortcoming or deficiency of the convoluted barrier diaphragm as just described, it has been found to be inadvisable to rely on the use of the back-up member method for obtaining sensor overpressure protection in transmitters which employ convoluted or other non-flat barrier diaphragms. This has required that such transmitters be provided with supplemental overpressure protecting means, with the result that such transmitters are unduly large, complex, and/or costly. An example of a transmitter requiring and embodying such suppplement overpressure protecting means is found in the U.S. Pat. 3,841,158.

SUMMARY OF THE INVENTION

Accordingly, it is an object of the present invention to provide an improved differential pressure transmitter embodying barrier diaphragms which are not subject to the noted shortcomings of the previously known diaphragms. It is, therefore, a specific object of the invention to provide such a transmitter wherein the barrier diaphragms are of a simple construction requiring only the simplest fabricating procedure, yet are not subject to "oil canning" or other discontinuous or inconsistent operating characteristics.

Another specific object of the invention is to provide an improved transmitter of the type just described wherein simple back-up surfaces for the barrier diaphragms give the degree of diaphragm/back-up surface match needed to effect the required sensor protection, even for sensors of the minute displacement type, without requiring impractical or difficult manufacturing procedures or operations, or supplemental overpressure protecting arrangements.

To the end of accomplishing the above-noted and other desirable objects, each barrier diaphragm of an improved transmitter construction according to the present invention is fabricated as a simple, thin, flat, flexible plate. After this flat diaphragm is sealed to the remainder of the head structure, the corresponding fill fluid chamber is filled with fluid to such an extent and pressure that the diaphragm is initially pumped up or bowed-out away from the head so as to have a some or spherical or cup shape. The extent of this bowing is made to be such that the traversal of the differential pressure over its normal operating range causes the barrier diaphragm to deflect about its initial bowed-out position by only such an amount that the diaphragm operates with an essentially continuous and consistent characteristic. Accordingly, "oil canning" and other discontinuous and irregular diaphragm operating characteristics are avoided. The need for the special fabricating procedures which are required to produce a convoluted or other non-flat diaphragm configuration is also avoided.

Moreover, an adequately high degree of match between the flat diaphragm surface and a back-up surface is obtained in the improved transmitter construction simply by making the back-up surface flat. Thus, no impractical or difficult manufacturing procedure is required to achieve the degree of diaphragm/back-up surface match which is required to afford adequate sensor overpressure protection, even for a minute deflection sensor. Also, no supplemental overpressure protecting arrangements are required.

BRIEF DESCRIPTION OF THE DRAWINGS

A better understanding of the present invention may be had when the following detailed description is read in connection with the accompanying drawings, in which:

FIG. 5 is a schematic diagram of a typical circuit employing the electrical bridge portion of the sensor of FIGS. 3 and 4.

DESCRIPTION OF THE PREFERRED EMBODIMENT

Figure 1:
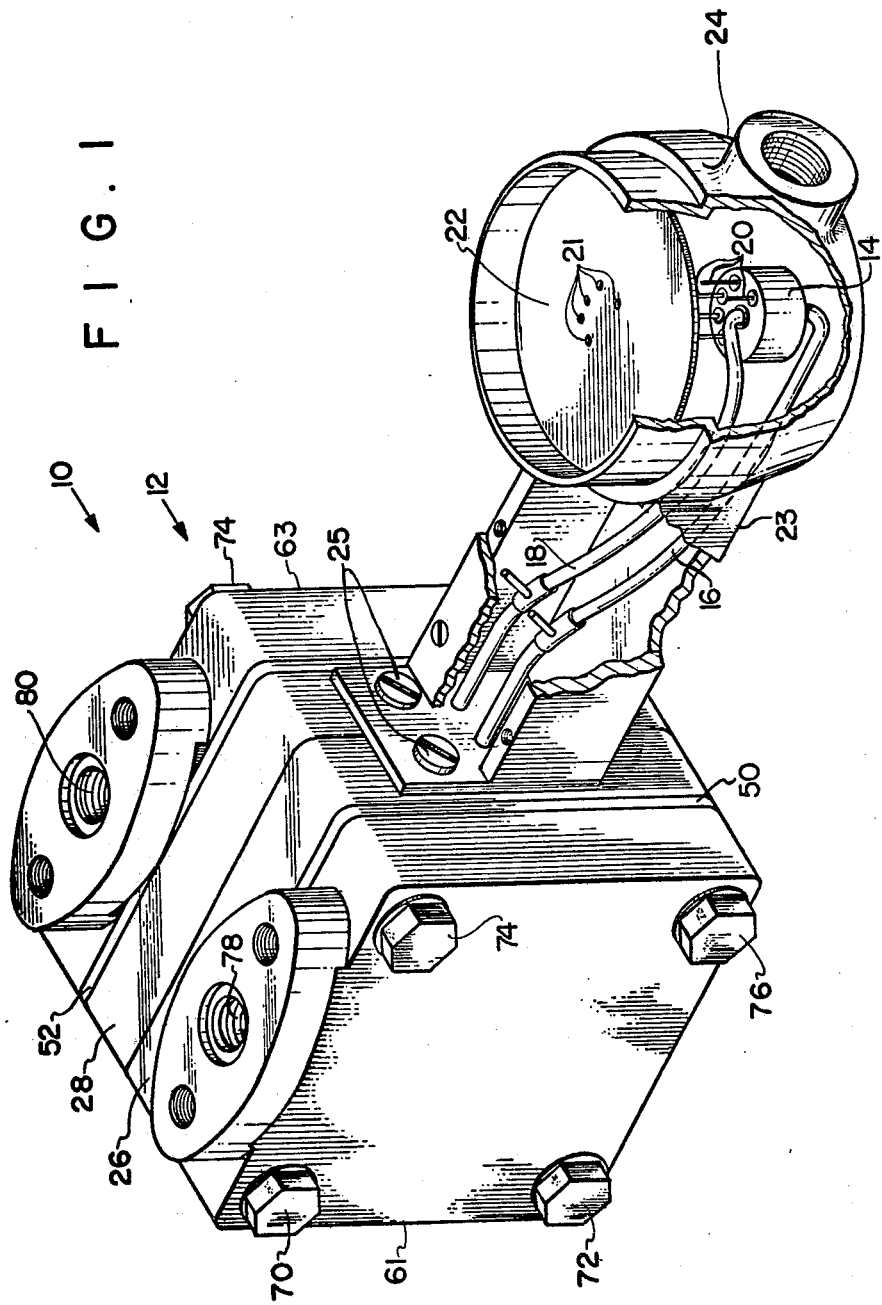
FIG. 1 is a perspective view of a differential pressure transmitter embodying a novel pressure sensing head construction according to the present invention.
Figure 2:
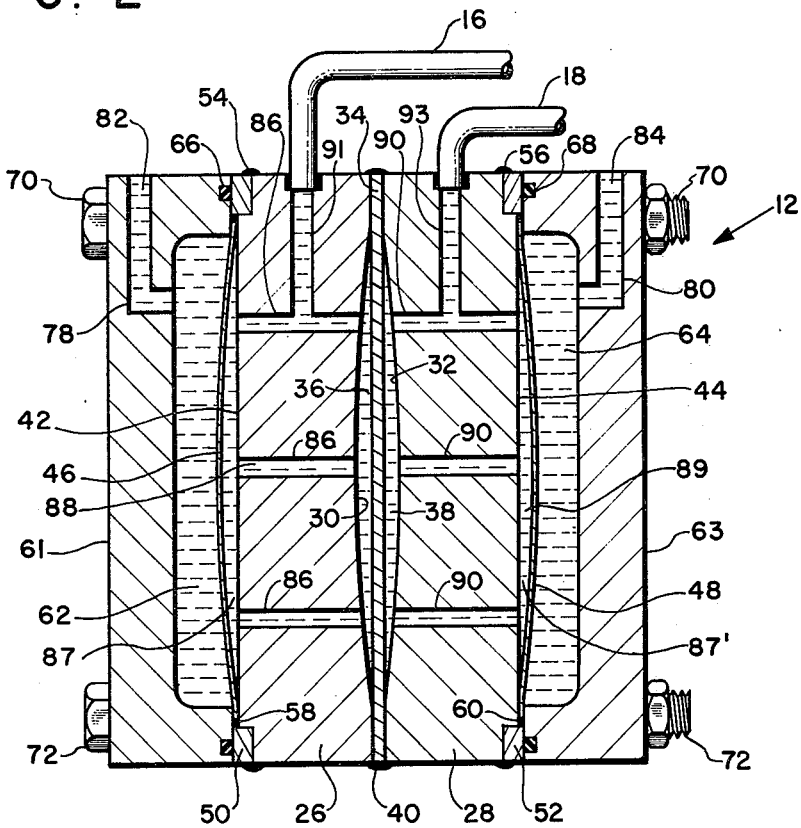
FIG. 2 is a cross-sectional view of a portion of the pressure sensing head of the FIG. 1 transmitter showing the novel head construction.

The transmitter 10 illustrated in FIGS. 1 and 2 constitutes a preferred embodiment of the pressure invention. This transmitter is constructed to produce an electrical output signal which is dependent upon the difference between the pressures of two applied fluids. To this end, and as shown in FIGS. 1 and 2, the transmitter 10 includes a pressure sensing head 12 which is coupled to a remotely located differential pressure sensor capsule 14 by capillary tubes 16 and 18. The capsule 14 and tubes 16 and 18 are enclosed in structure including a trough 23 and a generally circular housing 24. This structure is secured to the head 12 by means of screws 25.

The sensor capsule 14 contains a differential pressure sensing element having an electrical portion. The specific construction of the capsule 14 will be described hereinafter in connection with FIGS. 3 and 4. The electrical portion of the sensing element is connected by conductive leads or pins 20 to electrical terminals 21 on a printed circuit board 22 which is mounted within the housing 24.

The sensing head 12 includes two abutting identical blocks 26 and 28. As can be seen in FIG. 2, the block 26 is provided with an annular concave or dished-out surface 30. The block 28 is provided with a similar surface 32 which faces the surface 30. A center or control diaphragm 34 extends between the blocks 26 and 28 to form a first chamber 36 with the surface 30, and to form a second chamber 38 with the surface 32. The periphery of the diaphragm 34 is clamped between mating flat peripheral surfaces of the blocks 26 and 28. A fluid-tight joint between the blocks 26 and 28 and the diaphragm 34 is formed by seam welding these three components together around their entire peripheral surface as indicated at 40. This may be accomplished by means of a tungsten inert gas weld, commonly referred to as a TIG weld.

The remaining side of each of the blocks 26 and 28 is provided with a respective one of flat back-up surfaces 42 and 44. A barrier diaphragm 46 covers the surface 42, and a similar barrier diaphragm 48 covers the surface 44. The nature and condition of the barrier diaphragms 46 and 48 will be described in detail hereinafter.

A square frame or ring member 50 is mounted in a peripheral groove in the block 26. Similarly, a square frame or ring member 52 is mounted in a peripheral groove in the block 28. The members 50 and 52 are TIG seam welded to their respective blocks 26 and 28 as indicated at 54 and 56, respectively.

One face of the diaphragm 46 is peripherally sealed to the surface 42 by being peripherally TIG seam welded to the member 50 as indicated at 58. Similarly, one face of the diaphragm 48 is peripherally sealed to the surface 44 by being peripherally TIG seam welded to the member 52 as indicated at 60. All of the above-noted welds make fluid-tight joints.

A head member 61 having an internal dished-out surface is mounted on the block 26 to form a head chamber 62 with the outer face of the diaphragm 46. Similarly, a head member 63 having an internal dished-out surface is mounted on the block 28 to form a head chamber 64 with the outer face of the diaphragm 48. The members 61 and 63 are held in fluid-tight relationship with the respective rings 50 and 52 by means of respective O-rings seals 66 and 68, and by means of four bolt and nut assemblies 70, 72, 74, and 76.

An applied fluid inlet connection or passageway 78 for the chamber 62 is formed in the member 61. Similarly, an applied fluid inlet connection or passageway 80 for the chamber 64 is formed in the member 63. The two applied fluids, whose differential pressure is to be measured and transmitted, are applied by way of the respective passageways 78 and 80 to the respective chambers 62 and 64 and are respectively indicated at 82 and 84.

A plurality of passageways 86 interconnect, and provide fluid communication between, the chamber 36 on the left-hand side of the diaphragm 34 and a space or chamber 87 which is formed between the surface 42 and the diaphragm 46. The chamber 87 is formed by the pumping-up of the barrier diaphragms which is done in accordance with the present invention, as will be described hereinafter. A substantially incompressible fill liquid 88 completely fills the chambers 36 and 87 and the passageways 86.

A plurality of passageways 90 interconnect, and provide fluid communication between, the chamber 38 on the right-hand side of the diaphragm 34 and a space or chamber 87' which is formed between the surface 44 and the diaphragm 48 by the above-mentioned pumping-up of the barrier diaphragms. A substantially incompressible fill liquid 89 completely fills the chambers 38 and 87' and the passageways 90. It is preferable that the characteristics of the two fill liquids be substantially the same.

The capillary tube 16 is connected by a passageway 91 to the upper one of the passageways 86, whereby the tube 16 is filled with the fill liquid 88. The capillary tube 18 is connected by a passageway 93 to the upper one of the passageways 90, whereby the tube 18 is filled with the fill liquid 89.

As will be explained more fully hereinafter, the pressure of the applied fluid 82 is transmitted to the fill liquid 88 by way of the barrier diaphragm 46. Similarly, the pressure of the applied fluid 84 is transmitted to the fill liquid 89 by way of the barrier diaphragm 48. The pressures of the two fill liquids appear across the center diaphragm 34, and are also applied across the sensing element within the capsule 14 by the capillary tubes 16 and 18. Thus, a pressure difference appears across the sensing element which is the difference between the pressures of the fill liquids 88 and 89.

In accordance with the present invention, the barrier diaphragm 46 is fabricated as thin, flexible, flat sheet or plate. It is this plate, in its flat condition, which is peripherally welded at 58 to the ring member 50. The fill liquid 88 is subsequently introduced into the structure to such an extent and pressure that the diaphragm 46 becomes pumped up or bowed-out away from the surface 42. Accordingly, the diaphragm 46 assumes the bowed-out, spherical, dome, or cup shape illustrated in FIG. 2 when it is in its normal position—that is, when it is not being deflected by the applied fluid pressures. The extent of this initial bowing or pumping up is made to be such that the traversal of the applied fluid pressure difference over its normal operating range causes the diaphragm 46 to deflect about its illustrated initial bowed-out position by only such an amount that the diaphragm 46 operates with an essentially continuous, uniform, unvarying, and consistent deflection vs. pressure characteristic. Typical values for said normal operating range are those which are listed at the top of the column 10 of the above-noted U.S. Pat. No. 4,072,058.

The barrier diaphragm 48 is likewise fabricated as a thin, flexible, flat sheet or plate, and is secured, in its flat state, to its ring 52 by the peripheral weld 60. The fill liquid 89 is then made to pump up and bow out the diaphragm 48 away from the surface 44. Accordingly, the diaphragm 48 initially assumes the bowed-out shape illustrated in FIG. 2, just as the diaphragm 46 assumes its illustrated bowed-out initial position. Again, the extent of the initial bowing-out of the diaphragm 48 is made to be such that the traversal of the differential pressure of the applied fluids over its normal operating range causes the diaphragm 48 to deflect about the illustrated initial bowed-out position by only that desired amount which cause the diaphragm 48 to operate with an essentially continuous and consistent deflection vs. pressure characteristic.

The individual and relative size, stiffness, and other characteristics of the barrier diaphragms 46 and 48 and the center diaphragm 34 are selected to establish the differential pressure range over which the transmitter is to function, to cause the output of the sensing element to represent the applied fluid differential pressure when the latter lies in the established range, and to cause the barrier diaphragms to protect themselves and the sensing element upon the development of an overpressure condition. Such selection of the diaphragm characteristics may well be made on the basis of the same equations which are usually used in selecting diaphragm sizes, stiffnesses, and other characteristics in pressure transmitters to accommodate different differential pressure ranges. In so selecting the diaphragm characteristics, it has been found desirable to make the stiffness of the center diaphragm 34 of the order of one hundred times the stiffness of the barrier diaphragms 46 and 48.

To the end of providing the above-mentioned overpressure protection, the diaphragm parameters are so chosen that the above-noted pressure difference applied and appearing across the sensing element in the capsule 14 is prevented from rising to an unsafe value should such an overpressure condition occur. An unsafe value of this sensor pressure difference is one which would be sufficiently large to destroy, damage, or even degrade the sensing element.

Specifically, the diaphragms 34, 46, and 48 are so arranged that, before an increasing applied fluid pressure creates an overpressure condition and produces an unsafe sensing element pressure difference, the corresponding one of the barrier diaphragms 46 and 48 bottoms-out on its respective back-up surface 42 or 44. Such bottoming-out protects both the affected barrier diaphragm and the sensing element, as will be explained hereinafter in the description of the typical operation of the transmitter 10.

If desired, the flat diaphragms may be mechanically pre-bowed somewhat before being installed and pumped up if such pre-bowing is dictated by the extent of the bowing-out that is desired. In such cases, each back-up surface can be readily machined to give the required match with the pre-bowed diaphragm surface. Alternatively, the back-up surfaces can be machined first, and the pre-bowing of the diaphragms effected by forcing and fitting each diaphragm onto its mating back-up surface. Also, such diaphragms can be made to accommodate different differential pressure ranges simply by pumping them up to an extent corresponding to the desired range, providing that their stiffness is made to be controlling relative to that of the diaphragm 34.

Figure 3:
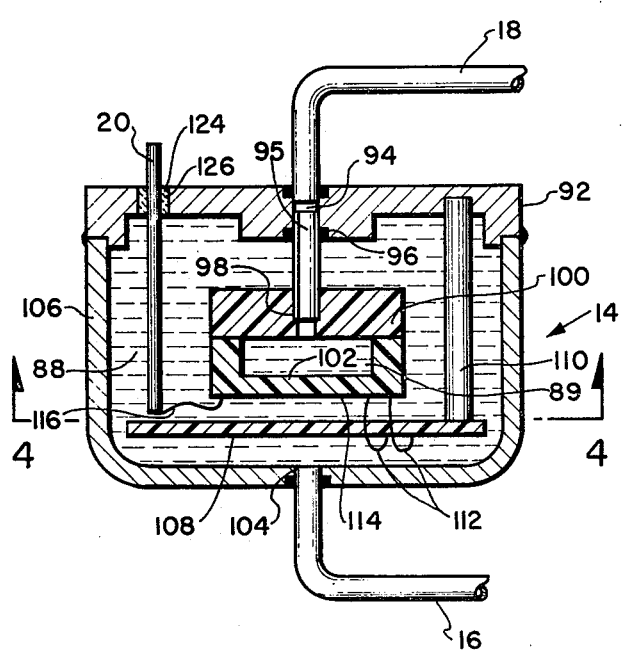
FIG. 3 is a cross-sectional view of a typical sensor construction which can be used as the sensor of the transmitter of FIGS. 1 and 2.
Figure 4:
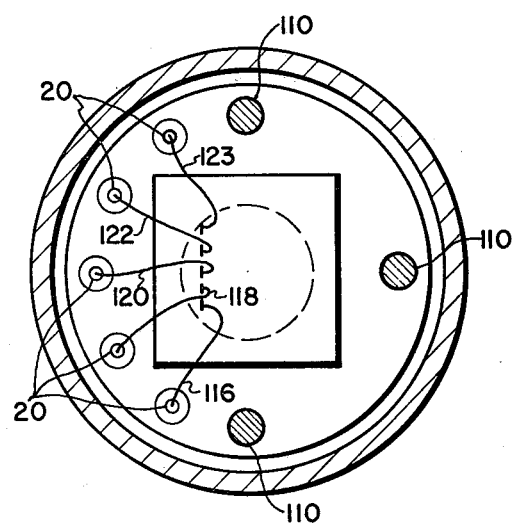
FIG. 4 is a bottom view of the sensor of FIG. 3 taken along the line 4—4 thereof.

As was noted previously, a typical construction for the sensor capsule 14 is illustrated in FIGS. 3 and 4. In this construction, the sensing element is of the above-noted minute deflection and minute volume displacement type. Referring to FIGS. 3 and 4, the capillary tube 18 is in fluid-tight engagement with the capsule 14, extending into a passageway 94 which is formed in a wall portion 92 of the capsule 14. A glass tube 95 extends between a position in the passageway 94, adjacent the end of the tube 18, and a position in a passageway 98 in a silicon support plate 100. The tube 95 is maintained in fluid-tight engagement with the passageway 94 by an epoxy seal 96, and is maintained in fluid-tight engagement with the passageway 98 by a suitable seal, such as that produced by the method disclosed in the Charnley et al U.S. Pat. No. 3,803,874. The capillary tube 16 extends through, and is in fluid-tight relationship with, an opening 104 in a cover portion 106 of the capsule 14.

A cup-shaped semiconductor sensing element or wafer 102, such as a silicon wafer, is bonded to the support plate 100. The fill liquid 88 which fills the tube 16 also fills the interior space or sensor chamber of the capsule 14. Accordingly, the pressure of the fill liquid 88 is applied to the outer surface or face or portion of the wafer 102. The fill liquid 89 which fills the tube 18 also fills the tube 95 and the sensor chamber which lies between the plate 100 and the wafer 102. Accordingly, the pressure of the fill liquid 89 is applied to the inner surface or portion of the wafer 102. Thus, the fill liquids 88 and 89 are caused to act on the respective opposite portions or faces of the wafer 102, whereby the difference between the pressure of the fill liquids 88 and 89 is applied across the wafer 102.

An ion migration shield 108 is mounted adjacent the wafer 102 by a number of stand-offs or rods 110. The shield 108 is electrically connected to the wafer 102 by a pair of conductors 112.

A wheatstone strain gauge bridge indicated at 114 is diffused into the outer surface of the wafer 102. A suitable number of fine wires 116, 118, 120, 122 and 123 extend between the bridge 114 and the pins 20. The latter pass out of the capsule 14 through fluid-tight glass seals 124 which are secured in openings 126 in the capsule wall 92.

A typical differential pressure readout circuit for use with the bridge 114 is shown in FIG. 5. In that circuit, the bridge 114 is connected to an amplifier 130, a constant current regulator 132, and a meter 134. The connection of the bridge 114 to these components would be accomplished in practice by connecting the components to the pins 20 by way of the terminals 21 of the printed circuit board 22 shown in FIG. 1. The circuit is powered by a suitable source, illustrated as a battery 128.

The FIG. 5 circuit may well be so arranged that the traversal of the applied fluid pressure difference over its normal operating range causes the output of the bridge 114 to vary in such a manner that the current through the meter 134 correspondingly varies between a minimum value of four milliamps and a maximum value of twenty milliamps. A detailed description of the construction and operation of a circuit of the type shown in FIG. 5 appears in the Demark U.S. Pat. No. 3,654,545.

The wafer 102 and its diffused bridge 114 form a sensor or sensing element of the above-noted minute displacement type. They thus experience only a minute displacement or deflection as the difference between the fluid pressures in the tubes 16 and 18 traverses its normal operating range. An excessive value of this pressure difference can well result in the degradation, damage, or destruction of the wafer 102 and its diffused bridge 114.

OPERATION OF THE PREFERRED EMBODIMENT

By virtue of the constructon of the transmitter 10 as just described, the pressure of the applied fluid 82 in the head chamber 62 is normally applied to the outer face or portion of the sensor wafer 102. This occurs by way of the barrier diaphragm 46 and the fill liquid 88 in the chambers 87 and 36, in the passageways 86 and 91, in the capillary tube 16, and in the capsule 14. Similarly, the pressure of the applied fluid 84 in the head chamber 64 is normally applied to the inner face or portion of the sensor wafer 102. This occurs by way of the barrier diaphragm 48 and the fill liquid 89 in the chambers 87' and 38, in the passageways 90 and 93, in the capillary tube 18, and in the chamber inside the wafer 102.

When the pressures of the applied fluids 82 and 84 in the respective head chambers 62 and 64 have the same value, the barrier diaphragms 46 and 48 and the central diaphragm 34 typically have the positions shown in FIG. 2. The bowed-out positions of the diaphragms 46 and 48 are the result of the initial pumping-up of these diaphragms which has been described hereinbefore. For this or any other condition of zero differential pressure of the applied fluids, the pressures on the two faces or sides of the sensor wafer 102 are equal, and the meter 134 indicates a differential pressure of zero.

Let it now be assumed that the pressure of the applied fluid 82 increases to a new value which is higher than that of the pressure of the applied fluid 84. This establishes a differential pressure for the applied fluids. It is further assumed that this differential pressure is within the normal operating range of the transmitter.

The above-noted increase in the pressure of the fluid 82 causes the barrier diaphragm 46 to deflect appropriately toward its back-up surface 42, whereby the fill liquid 88 transmits or applies the new, higher pressure to the outer surface of the wafer 102. There is now a pressure difference across the wafer 102 which causes the latter to deflect by a corresponding amount.

Since the diaphragm 46 has been deflected with respect to its initial pumped-up position, it does not introduce any error in transmitting the new pressure to the wafer 102. Accordingly, the resulting change in pressure across the wafer 102 is an accurate and faithful reproduction of the noted change in applied fluid pressure.

The noted deflection of the wafer 102 produces corresponding changes in the output of the bridge 114 and in the current flowing through the meter 134. As a result, the meter 134 provides an indication of the differential pressure which now exists across the wafer 102 and between the two applied fluids.

An increase in the pressure of the applied fluid 84 which increases the applied fluid differential pressure within the operating range causes the barrier diaphragm 48 to deflect appropriately toward the back-up surface 44, and causes a corresponding change in the pressure of the fill liquid 89 and the pressure on the inner surface of the wafer 102. This action is the counterpart of that described above for an in-range increase in the pressure of the fluid 82.

A decrease in the pressure of an applied fluid causes the corresponding barrier diaphragm to deflect away from the corresponding back-up surface. This causes an accurate corresponding decrease in the pressure acting on the corresponding side of the wafer 102. Here again, the novel form and condition of the barrier diaphragm causes the wafer deflection to follow the differential pressure of the applied fluids in a highly accurate and consistent manner.

Accordingly, at any given time in the normal operation of the transmitter 10, the wafer 102 is deflected by an amount which is a faithful representation of the differential pressure of the applied fluids. The extent of this deflection is shown by the meter 134. Thus, as long as the applied fluid differential pressures lies in its normal range, the differential pressure across the wafer 102, the deflection of the latter, and the indication provided by the meter 134 are consistently accurately representative of the applied fluid differential pressure.

Let it now be assumed that one of the applied fluid pressures, the pressure of the applied fluid 82, for example, becomes sufficiently higher than the other applied fluid pressure to make the difference between these pressures closely approach an overpressure value. This causes the barrier diaphragm 46 to bottom-out on its back-up surface 42. The center diaphragm 34 moves sufficiently toward the surface 32 at this time to permit the chamber 36 to effectively expand and to accommodate the quantity of the fill fluid 88 which must be displaced from the chamber 87 in order to allow the barrier diaphragm 46 to so bottom-out. All of this occurs without raising the pressure difference across the wafer 102 to an unsafe value, even in the face of the minute volume displacement characteristic of the wafer and the consequent susceptability of the wafer to being damaged by even a small degree of excessive pressure difference.

Further increases in the pressure of the fluid 82 which raise the applied fluid differential pressure to overpressure values do not affect either the barrier diaphragm 46, the fill liquid 88, or the wafer 102. This is so because the inherently superior match between the flat surfaces of the diaphragm 46 and the back-up surface 42 causes the latter to fully support the bottomed-out diaphragm 46, and thus to prevent it from being damaged or distorted by the pressure of the applied fluid 82. Said superior match also now isolates the fill liquid 88 and the wafer 102 from the pressure of the fluid 82, so that said further increases in that pressure are not transmitted to, and thus do not reach and harm, the wafer 102.

Summarizing the foregoing, an increasing pressure of the fluid 82 which moves the applied fluid differential pressure into the overpressure state first causes the barrier diaphragm 46 to bottom-out. Thereafter, the pressure of the fill liquid 88 as applied to the wafer 102 does not increase with the further increase in the pressure of the fluid 82, but is held at the safe value which the fluid 82 had at the time that it bottomed-out the diaphragm 46.

Upon a change in the applied fluid pressures which causes the barrier diaphragm 48 to bottom-out on its back-up surface 44, the diaphragm 48 becomes fully supported and hence protected as in the case of the bottomed-out diaphragm 46. Also, further increases in the applied fluid pressure now acting on the bottomed-out diaphragm 48 are prevented from being transmitted to the fill liquid 89 and to the wafer 102, again as in the case of the bottomed-out diaphragm 46.

Accordingly, the pressure difference across the wafer 102 is never permitted to rise to an unsafe value, even though an overpressure value of differential pressure for the applied fluids 82 and 84 is present. The higher of the two applied fluid pressures producing the overpressure condition causes the corresponding barrier diaphragm to bottom-out and thus hold the pressure across the wafer to the safe value which it had at the time at which the bottoming-out occurred. Therefore, the wafer 102 is prevented from receiving any value of that higher fluid pressure which exceeds the value at which the bottoming-out took place.

It is noted that a transmitter according to the present invention need not necessarily employ the specific form of center diaphragm arrangement which has been incorporated by way of example in the illustrative embodiment of the invention. Thus, any of the several center diaphragm constructions disclosed in the above-noted copending application could be used in lieu of the diaphragm 34 if desired. Also, a transmitter according to the present invention need not necessarily employ a remotely located sensor and capillary tubes as has been illustrated herein by way of example but instead could as well employ a sensor located within the head structure in the manner disclosed in the Weaver et al U.S. Pat. No. 3,712,143.

It is noted also that the transmitters illustrated herein have been illustrated, by way of example, as being of the type in which each of the two applied fluid pressures, whose differential is to be sensed, acts on the sensor by way of a corresponding barrier diaphragm and fill liquid. It is to be understood, however, that the disclosed novel barrier diaphragm configuration is equally effective in transmitters wherein the differential pressure to be sensed is the difference between one pressure which acts on one side of the sensor by way of a barrier diaphragm and fill liquid, and an atmospheric or a fixed pressure which acts on the other side of the sensor. That is, the novel barrier diaphragm construction according to the present invention is equally effective where the two applied fluid pressures are one process pressure and an atmospheric or a fixed pressure, and where only a single barrier diaphragm and fill fluid are therefore required and utilized.

In summary, there has been provided, in accordance with the present invention, improved differential pressure to electrical signal transmitter structure which employs a simple form of barrier diaphragm requiring only the simpliest fabricating procedure and yet providing uniform and consistent operation without "oil canning". Said simple diaphragm form also provides superior overpressure protection when used with but a simple back-up surface not requiring impractical or difficult manufacturing procedures or operations, and not requiring supplemental overpressure protecting arrangements to adequately protect a minute displacement form of sensor.

The embodiments of the invention in which an exclusive property or privilege is claimed are defined as follows:

1. A pressure sensing head comprising
   head structure having a substantially flat back-up surface,
   a substantially flat, deformable barrier diaphragm of a preselected stiffness having first and second faces and a peripheral edge which is sealed to said surface so that said first face faces said surface,
   means for applying a fluid pressure force to said second face which is representative of a fluid pressure to be sensed, said surface physically matching said first face sufficiently to fully back up and support said diaphragm and prevent its deleterious deformation in the presence of values of said fluid pressure force which force said diaphragm to bottom-out against said surface, a first fluid chamber of expansible volume having fluid communication with said first face, and a preselected quantity of a substantially incompressible fill fluid completely filling said first chamber and exerting a deforming force on said first face which deforms and bows-out said diaphragm away from said surface into a dome shape to form a second fluid chamber between said first face and said surface which is completely filled with said fluid, said diaphragm stiffness and said fill fluid quantity, and hence said deforming force, being preselected, in the absence of said fluid pressure force on said second face, to cause said deforming force normally to bow-out said diaphragm by a preselected amount to a normal bowed-out position for which the traversal of said fluid pressure force throughout its normal operating range deflects said diaphram about its said normal bowed-out position to only that extent which causes said diaphragm to deflect without oil canning, and thus to deflect with only an essentially continuous, uniform, unvarying, and consistent deflection vs. pressure characteristic, whereby the pressure of said fill fluid is consistently representative of said fluid pressure to be sensed throughout said normal operating range.

2. Apparatus as specified in claim 1, wherein said first chamber includes a deflectable control diaphragm as one of the walls of said first chamber.

3. Apparatus as specified in claim 2, wherein the stiffness of said control diaphragm is of the order of one hundred times the stiffness of said barrier diaphragm.

4. A pressure sensing head comprising head structure having a substantially flat back-up surface and a second surface, a substantially flat, deformable barrier diaphragm of a preselected stiffness having first and second faces and a peripheral edge which is sealed to said back-up surface so that said first face faces said back-up surface, means for applying a fluid pressure force to said second face which is representative of a fluid pressure to be sensed, said back-up surface physically matching said first face sufficiently to fully back up and support said diaphragm and prevent its deleterious deformation in the presence of values of said fluid pressure force which force said diaphragm to bottom-out against said back-up surface, a control diaphragm mounted in spaced and peripherally sealed relationship to said second surface to form a first fluid chamber of expansible volume between one side of said control diaphragm and said second surface, passage means providing fluid communication between said first chamber and said first face, and a preselected quantity of a substantially incompressible fill fluid completely filling said first chamber and said passage means and exerting a deforming force on said first face which deforms and bows-out said barrier diaphragm away from said back-up surface into a dome shape to form a second fluid chamber between said first face and said back-up surface which is completely filled with said fluid, said barrier diaphragm stiffness and said fill fluid quantity, and hence said deforming force, being preselected, in the absence of said fluid pressure force on said second face, to cause said deforming force normally to bow-out said barrier diaphragm by a preselected amount to a normal bowed-out position for which the traversal of said fluid pressure force throughout its normal operating range deflects said barrier diaphragm about its said normal bowed-out position to only that extent which causes said barrier diaphragm to deflect without oil canning, and thus to deflect with only an essentially continuous, uniform, unvarying, and consistent deflection vs. pressure characteristic, whereby the pressure of said fill fluid is consistently representative of said fluid pressure to be sensed throughout said normal operating range.

5. A pressure sensing head comprising head structure having first and second substantially flat back-up surfaces, a third surface, and a fourth surface, a first substantially flat, deformable barrier diaphragm of a preselected stiffness having first and second faces and a peripheral edge which is sealed to said first back-up surface so that said first face faces said first back-up surface, a second substantially flat, deformable barrier diaphragm of a preselected stiffness having first and second faces and a peripheral edge which is sealed to said second back-up surface so that said first face of said second barrier diaphragm faces said second back-up surface, means for applying a first fluid pressure force to said second face of said first barrier diaphragm which is representative of a first fluid pressure to be sensed, said first back-up surface physically matching said first face of said first barrier diaphragm sufficiently to fully back up and support said first barrier diaphragm and prevent its deleterious deformation in the presence of values of said first fluid pressure force which force said first barrier diaphragm to bottom-out against said first back-up surface, means for applying a second fluid pressure force to said second face of said second barrier diaphragm which is representative of a second fluid pressure to be sensed, said second back-up surface physically matching said first face of said second barrier diaphragm sufficiently to fully back up and support said second barrier diaphragm and prevent its deleterious deformation in the presence of values of said second fluid pressure force which force said second barrier diaphragm to bottom-out against said second back-up surface, a control diaphragm mounted in spaced and peripherally sealed relationship to said third and fourth surfaces to form a first fluid chamber of expansible volume between one side of said control diaphragm and said third surface, and to form a second fluid chamber of expansible volume between the other side of said control diaphragm and said fourth surface, first passage means providing fluid communication between said first chamber and said first face of said first barrier diaphragm, second passage means providing fluid communication between said second chamber and said first face of said second barrier diaphragm, a first preselected quantity of a substantially incompressible fill fluid completely filling said first chamber and said first passage means and exerting a deforming force on said first face of said first barrier diaphragm which deforms and bows-out said first barrier diaphragm away from said first back-up surface into a dome shape to form a third fluid chamber between said first face of said first barrier diaphragm and said first back-up surface which is completely filled with said fluid, and a second preselected quantity of a substantially incompressible fill fluid completely filling said second chamber and said second passage means and exerting a deforming force on said first face of said second barrier diaphragm which deforms and bows-out said second barrier diaphragm away from said second back-up surface into a dome shape to form a fourth fluid chamber between said first face of said second barrier diaphragm and said second back-up surface which is completely filled with said fluid, said stiffnesses of said barrier diaphragms and said quantities of said fill fluids, and hence said deforming forces, being preselected, in the absence of said fluid pressure forces on said second faces, to cause said deforming forces normally to bow-out the respective barrier diaphragms by preselected amounts to normal bowed-out positions for which the traversal of the difference between said first and second fluid pressure forces throughout its normal operating range deflects said barrier diaphragms about their normal bowed-out positions to only those extents which cause said barrier diaphragms to deflect without oil canning, and thus to deflect with only an essentially continuous, uniform unvarying, and consistent deflection vs. pressure characteristic, whereby the difference between the pressures of said first and second fill fluids is consistently representative of the difference between said first and second fluid pressures to be sensed throughout said normal operating range.

6. A differential pressure to electrical signal transmitter comprising head structure having a substantially flat back-up surface, a substantially flat, deformable barrier diaphragm of a preselected stiffness having first and second faces and a peripheral edge which is sealed to said surface so that said first face faces said surface, means for applying a fluid pressure force to said second face which is representative of a first fluid pressure to be sensed, said surface physically matching said first face sufficiently to fully back up and support said diaphragm and prevent its deleterious deformation in the presence of values of said fluid pressure force which force said diaphragm to bottom-out against said surface, a first fluid chamber of expansible volume having fluid communication with said first face, a preselected quantity of a substantially incompressible fill fluid completely filling said first chamber and exerting a deforming force on said first face which deforms and bows-out said diaphragm away from said surface into a dome shape to form a second fluid chamber between said first face and said surface which is completely filled with said fluid, said diaphragm stiffness and said fill fluid quantity, and hence said deforming force, being preselected, in the absence of said fluid pressure force on said second face, to cause said deforming force normally to bow-out said diaphragm by a preselected amount to a normal bowed-out position for which the traversal of said fluid pressure force throughout its normal operating range deflects said diaphragm about its said normal bowed-out position to only that extent which causes said diaphragm to deflect without oil canning, and thus to deflect with only an essentially continuous, uniform, unvarying, and consistent deflection vs. pressure characteristic, differential pressure sensor means including a sensing element having first and second element portions and an electrical output connection and operative to produce in said output connection a signal representative of the difference between the pressures of two fluids acting, respectively, on said first and second element portions, first means for applying the pressure of said fill fluid to said first element portion, and second means for applying to said second element portion a second fluid pressure to be sensed, whereby the difference between the pressures acting on said first and second element portions is consistently representative of the difference between said first and second fluid pressures to be sensed throughout said normal operating range.

7. Apparatus as specified in claim 6, wherein said first chamber includes a deflectable control diaphragm as one of the walls of said first chamber.

8. Apparatus as specified in claim 7, wherein the stiffness of said control diaphragm is of the order of one hundred times the stiffness of said barrier diaphragm.

9. Apparatus as specified in claim 6, wherein said sensor means is located at a position which is remote from said head structure, said first means includes a capillary tube which is connected between said first chamber and said sensor means and which is filled with said fill fluid, and said fill fluid pressure is transmitted to said first element portion by said fill fluid in said tube.

10. A differential pressure to electrical signal transmitter comprising head structure having a substantially flat back-up surface and a second surface, a substantially flat, deformable barrier diaphragm of a preselected stiffness having first and second faces and a peripheral edge which is sealed to said back-up surface so that said first face faces said back-up surface, means for applying a fluid pressure force to said second face which is representative of a first fluid pressure to be sensed, said back-up surface physically matching said first face sufficiently to fully back up and support said diaphragm and prevent its deleterious deformation in the presence of values of said fluid pressure force which force said diaphragm to bottom-out against said back-up surface, a control diaphragm mounted in spaced and peripherally sealed relationship to said second surface to form a first fluid chamber of expansible volume between one side of said control diaphragm and said second surface, differential pressure sensor means including a sensing element having first and second element portions and an electrical output connection and operative to produce in said output connection a signal representatiive of the difference between the presures of two fluids acting, respectively, on said first and second element portions, passage means providing fluid communication between said first chamber, said first face, and said first element portion, a preselected quantity of a substantially incompressible fill fluid completely filling said first chamber and said passage means and exerting a deforming force on said first face which deforms and bows-out said barrier diaphragm away from said back-up surface into a dome shape to form a second fluid chamber between said first face and said back-up surface which is completely filled with said fluid, said barrier diaphragm stiffness and said fill fluid quantity, and hence said deforming force, being preselected, in the absence of said fluid pressure force on said second face, to cause said deforming force normally to bow-out said barrier diaphragm by a preselected amount to a normal bowed-out position for which the traversal of said fluid pressure force throughout its normal operating range deflects said barrier diaphragm about its said normal bowed-out position to only that extent which causes said barrier diaphragm to deflect without oil canning, and thus to deflect with only an essentially continuous, uniform, unvarying, and consistent deflection vs. pressure characteristic, and means for applying to said second element portion a second fluid pressure to be sensed, whereby the difference between the pressures acting on said first and second element portions is consistently representative of the difference between said first and second fluid pressures to be sensed throughout said normal operating range.

11. Apparatus as specified in claim 10, wherein stiffness of said control diaphragm is of the order of one hundred times the stiffness of said barrier diaphragm.

12. Apparatus as specified in claim 10, wherein said sensor means is located at a position which is remote from said head structure, said passage means includes a capillary tube which is connected between said first chamber and said sensor means and which is filled with said fill fluid, and said fill fluid pressure is transmitted to said first element portion by said fill fluid in said tube.

13. A differential pressure to electrical signal transmitter comprising head structure having first and second substantialy flat back-up surfaces, a third surface, and a fourth surface, a first substantially flat, deformable barrier diaphragm of a preselected stiffness having first and second faces and a peripheral edge which is sealed to said first back-up surface so that said first face faces said first back-up surface, a second substantially flat, deformable barrier diaphragm of a preselected stiffness having first and second faces and a peripheral edge which is sealed to said second back-up surface so that said first face of said second barrier diaphragm faces said second back-up surface, means for applying a first fluid pressure force to said second face of said first barrier diaphragm which is representative of a first fluid pressure to be sensed, said first back-up surface physically matching said first face of said first barrier diaphragm sufficiently to fully back up and support said first barrier diaphragm and prevent its deleterious deformation in the presence of values of said first fluid pressure force which force said first barrier diaphragm to bottom-out against said first back-up surface, means for applying a second fluid pressure force to said second face of said second barrier diaphragm which is representative of a second fluid pressure to be sensed, said second back-up surface physically matching said first face of said second barrier diaphragm sufficiently to fully back up and support said second barrier diaphragm and prevent its deleterious deformation in the presence of values of said second fluid pressure force which force said second barrier diaphragm to bottom-out against said second back-up surface, a control diaphragm mounted in spaced and peripherally sealed relationship to said third and fourth surfaces to form a first fluid chamber of expansible volume between one side of said control diaphragm and said third surface, and to form a second fluid chamber of expansible volume between the other side of said control diaphragm and said fourth surface, differential pressure sensor means including first and second sensor chambers, an electrical output connection, and a sensing element which is subjected to and responsive to the pressure difference between fluids within said first and second sensor chambers to produce in said output connection a signal representative of said pressure difference, first passage means providing fluid communication between said first fluid chamber, said first face of said first barrier diaphragm, and said first sensor chamber, second passage means providing fluid communication between said second fluid chamber, said first face of said second barrier diaphragm, and said second sensor chamber, a first preselected quantity of a substantially incompressible fill fluid completely filling said first chamber and said first passage means and exerting a deforming force on said first face of said first barrier diaphragm which deforms and bows-out said first barrier diaphragm away from said first back-up surface into a dome shape to form a third fluid chamber between said first face of said first barrier diaphragm and said first back-up surface which is completely filled with said fluid, and a second preselected quantity of a substantially incompressible fill fluid completely filling said second chamber and said second passage means and exerting a deforming force on said first face of said second barrier diaphragm which deforms and bows-out said second barrier diaphragm away from said second back-up surface into a dome shape to form a fourth fluid chamber between said first face of said second barrier diaphragm and said second back-up surface which is completely filled with said fluid, said stiffnessess of said barrier diaphragms and said quantities of said fill fluids, and hence said deforming forces, being preselected, in the absence of said fluid pressure forces on said second faces, to cause said deforming forces normally to bow-out the respective barrier diaphragms by preselected amounts to normal bowed-out positions for which the traversal of the difference between said first and second fluid pressure forces throughout its normal operating range deflects said barrier diaphragms about their normal bowed-out positions to only those extents which cause said barrier diaphragms to deflect without oil canning, and thus to deflect with only an essentially continuous, uniform, unvarying, and consistent deflection vs. pressure characteristic, whereby the difference between the pressures of said fluids within said first and second sensor chambers is consistently representative of the difference between said first and second fluid pressures to be sensed throughout said normal operating range.

14. Apparatus as specified in claim 13, wherein the stiffness of said control diaphragm is of the order of one hundred times the stiffnes of said barrier diaphragms.

15. Apparatus as specified in claim 13, wherein said sensor means is located at a position which is remote from said head structure, said first passage means includes a first capillary tube which is connected between said first fluid chamber and said first sensor chamber, which is filled with said first fill fluid, and which provides said fluid communication with said first sensor chamber, and said second passage means includes a second capillary tube which is connected between said second fluid chamber and said second sensor chamber, which is filled with said second fill fluid, and which provides said fluid communication with said second sensor chamber.

* * * * *